United States Patent
Voris et al.

(10) Patent No.: US 10,616,545 B2
(45) Date of Patent: Apr. 7, 2020

(54) RETROREFLECTIVE GARMENT PHOTOGRAPHY

(71) Applicants: John Voris, Los Gatos, CA (US); Matthew Wolfe, Redwood City, CA (US); John Friedl, Danville, CA (US); Joshua Mahoney, Union City, CA (US)

(72) Inventors: John Voris, Los Gatos, CA (US); Matthew Wolfe, Redwood City, CA (US); John Friedl, Danville, CA (US); Joshua Mahoney, Union City, CA (US)

(73) Assignee: THREDUP INC., San Francisco, CA (US)

( * ) Notice: Subject to any disclaimer, the term of this patent is extended or adjusted under 35 U.S.C. 154(b) by 0 days.

(21) Appl. No.: 15/808,776

(22) Filed: Nov. 9, 2017

(65) Prior Publication Data

US 2019/0141306 A1    May 9, 2019

(51) Int. Cl.
*H04N 9/73* (2006.01)
*H04N 1/60* (2006.01)
*G06Q 30/06* (2012.01)

(52) U.S. Cl.
CPC ......... *H04N 9/735* (2013.01); *G06Q 30/0635* (2013.01); *H04N 1/6077* (2013.01); *H04N 1/6086* (2013.01); *H04N 9/73* (2013.01)

(58) Field of Classification Search
CPC ........ H04N 9/735; H04N 9/73; H04N 1/6086; G06Q 30/0635
See application file for complete search history.

(56) References Cited

U.S. PATENT DOCUMENTS

| | | | |
|---|---|---|---|
| 7,273,176 B2 * | 9/2007 | Eisenberg | G02B 5/124 235/436 |
| 9,230,275 B1 * | 1/2016 | Voris | G06Q 30/0623 |
| 9,273,954 B2 * | 3/2016 | Boutboul | G06T 7/564 |
| 9,674,407 B2 * | 6/2017 | Gupta | H04N 5/2251 |

(Continued)

OTHER PUBLICATIONS

Image of Website: LEDchromaKEY.com, Lightring Chromakey Technology, LED Chromakey Systems, Apr. 11, 2017, 1 page.
Image of Website: Reflective Sign Sheeting, 3M, undated, 1 page.

*Primary Examiner* — Padma Haliyur
(74) *Attorney, Agent, or Firm* — Fenwick & West LLP (57) ABSTRACT

A camera system including imaging optics, a system controller, a retroreflective surface, and an illumination source allows for capturing high quality images that allow for similar white balance between subsequent images. The camera system includes a camera body coupled to the illumination source such that the illumination source emits light towards the retroreflective surface. An object, is mounted to the retroreflective surface such that at least part of the retroreflective surface is obscured by the garment. Consequently, the light emitted from the illumination source is reflected by both the retroreflective surface and the object towards the camera body. The camera body contains imaging optics which capture an image from the reflected light. Thus, the camera system captures images of the object and retroreflective surface. The camera system similarly white balances any number of images including any number of objects.

22 Claims, 8 Drawing Sheets

(56) References Cited

U.S. PATENT DOCUMENTS

| | | | |
|---|---|---|---|
| 2011/0096183 A1* | 4/2011 | Robertson | H04N 5/275 348/222.1 |
| 2013/0300637 A1* | 11/2013 | Smits | G03B 35/18 345/8 |
| 2015/0199018 A1* | 7/2015 | Kim | G06F 3/017 345/156 |

* cited by examiner

RETROREFLECTIVE GARMENT PHOTOGRAPHY

BACKGROUND OF THE INVENTION

This invention relates generally to camera systems, and more specifically to camera systems designed for obtaining images of objects with on a white background.

Capturing images of objects, and, in particular, white or light objects, against a white background for display as part of an online catalog for an order fulfillment system is a challenging problem. When images are captured using traditional camera systems the objects and images can include different color casts between those images and the colors of the objects in those images are inaccurately represented. That is, what is orange in one image, may be orange-white in another image. Color inaccuracies such as this are detrimental to the order fulfillment process.

Most traditionally, capturing images on a white background includes camera systems with a passive white background that is highly illuminated using flashes or lamps such that the white background is well illuminated in the captured image. Unfortunately, capturing an image with a proper representation of a white background requires illumination that can introduce a color cast or washes out the colors of an object in the image. Thus, the captured images inaccurately represent the colors of the object against the background which is detrimental for displaying the objects in a catalog.

Various systems and methods have been used to more accurately image objects against a white background. In one example, expensive and complex lighting and rigging systems are created such that an object is accurately imaged (e.g., a large flash systems or diffused light systems). In another examples, intricate post processing methods are applied to the captured images to digitally enhance color accuracy. Thus, an easy inexpensive system and method for capturing images with a white background without misrepresenting the imaged object is desirable.

SUMMARY OF THE INVENTION

A camera system including imaging optics, a system controller, a retroreflective surface, and an illumination source allow for capturing high quality images against a pure-white background between subsequent images.

The camera system includes a camera body coupled to the illumination source such that the illumination source emits light towards the retroreflective surface. The illumination source may comprise an array of low-power LEDs configured to emit a white light spectrum. An object, typically a garment, is mounted to the retroreflective surface such that at least part of the retroreflective surface is obscured by the garment. Consequently, the light emitted from the illumination source is reflected by both the retroreflective surface and the object towards the camera body. Light reflected by the object can be any color and light reflected by the retroreflective surface is white and sufficiently bright to saturate the image sensor.

The camera body contains imaging optics which include optical elements configured to focus reflected light onto an image sensor that generates an image from the reflected light. Thus, the camera system captures images including areas of the retroreflective surface and the object. The areas of the retroreflective surface in the captured image are over-saturated white pixels which allow for light- and white colored objects to be easily imaged. Subsequent images are all captured using the same camera system and contain similar over-saturated white pixels which is beneficial for display on order fulfillment systems.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
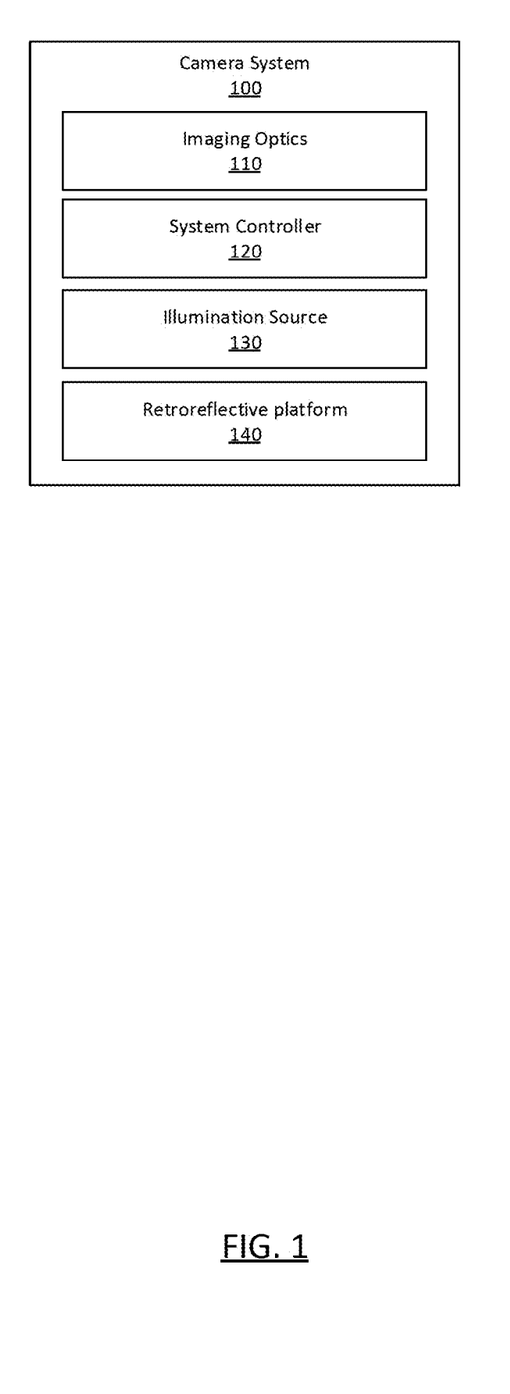
FIG. 1 is diagram representing the camera system, according to one example embodiment.

FIG. 1 is a system level description of a camera system 100 for high quality imaging of objects against a white background. The camera system 100 includes a camera body containing a set of imaging optics 110 and a system controller 120 for capturing images. Further, the camera system 100 also includes an illumination source 130 for illuminating objects for image capture and a retroreflective surface 140 for mounting an object to be imaged by the imaging optics. The camera system 100 is configured to capture any number of images of varying objects with the same or similar over-saturated white areas in the background.

As an example, an object (i.e., a garment, an accessory, etc.) is mounted to the retroreflective surface 140 such that it can be imaged by the camera system 100. The camera system 100 emits light from an illumination source 130 towards the object mounted on the retroreflective surface 140. Generally, the illumination source 130 emits similar monochromatic light for every captured image. The emitted light reflects off of the retroreflective surface 140 towards the imaging optics 110 in areas where the retroreflective surface 140 is unobscured by the object. In areas where the retroreflective surface 140 is obscured by the object, the light reflects off of the object towards the imaging optics 110. Typically, the light reflecting off of the retroreflective surface 140 is the same color as the light incident to the retroreflective surface (e.g., white), and the light reflecting off of the object is any color of light representing that object. Accordingly, every captured image includes monochromatic areas (i.e. areas unobscured by the object) and a representation of the object. In one configuration where the illumination source 130 emits a monochromatic white light, the retroreflective surface 140 reflects the white light at a brightness level such the white light oversaturates pixels of the image sensor of the imaging optics 110. In this case, similar over-saturated white areas appear in any number of images including any type of object. The over-saturated white areas (i.e., pure-white areas) allow for white and light objects to be more easily imaged than in traditional camera systems. Further, the pure-white areas allow for the boundaries of the imaged objects to be more visible in the generated images.

Returning to FIG. 1 to provide more detail for the camera system 100, the imaging optics 110 can be, for example, a telephoto lens, a standard lens, a wide angle lens, a hemispherical lens, etc. that focuses light entering the lens to an image sensor which captures images. The imaging optics 110 can further include any number of optical elements for capturing images including: mirrors, lenses, filters, diffusers, polarizers, gratings, and windows. The image sensor can be any sensor or element capable of detecting and conveying information that constitutes an image. As some examples, the image sensor can be a semiconductor charge coupled device (CCD), active pixel sensors (CMOS), vacuum tubes, or a film system. Typically, the imaging optics 110 are coupled to a camera body and the optical elements relay reflected light representing the retroreflective surface and object to the image sensor internal to the camera body. Generally, areas that appear pure-white on an image captured by the image sensor are elements (e.g., pixels, etc.) that are oversaturated (e.g., pixel values of 255).

The camera system 100 additionally includes a system controller 120 (e.g., a microcontroller or microprocessor) that controls the operation and functionality of the camera system 100 and a system memory configured to store executable computer instructions that, when executed by the system controller and/or the image processors, perform the camera functionalities described hereafter. Generally, the system controller 120 and system memory are internal the camera body.

The system controller 120 includes an image processor that performs one or more image processing functions of the captured images. For example, the image processor may white balance the image. That is, the image processor can select monochromatic areas of the image for white balancing and white balance the image based on that area. In another configuration, the image processor can white balance an image using settings and information stored in the camera system memory that remove color casts. In another configuration, the image processor can normalize an image or series of images based on settings stored in the camera system 100. Processed images and video may be temporarily or persistently stored to the camera system 100 memory and/or to a non-volatile storage, which may be in the form of internal storage or an external memory card.

The system controller 120 additionally includes an input/output (I/O) interface transmits and receives data from various external devices. For example, the I/O interface may facilitate the receiving or transmitting image data through an I/O port. Examples of I/O ports or interfaces include USB ports, HDMI ports, Ethernet ports, and the like. Furthermore, embodiments of the I/O interface may include wireless ports that can accommodate wireless connections. Examples of wireless ports include Bluetooth, Wireless USB, Near Field Communication (NFC), and the like. The I/O interface may also include an interface to synchronize the camera with other cameras or with other external devices, such as a remote control, a second camera, a smartphone, a client device, or a video server.

The system controller 120 can also include sensors which capture various metadata concurrently with, or separately from, image capture. For example, the sensors may capture time-stamped location information based on a global positioning system (GPS) sensor, radio frequency identification (RFID) sensor, system clock, etc. Additionally, the sensors may include sensors that determine the color temperature, saturation, brightness, etc. of captured light. The system controller 120 can use information from the sensors to assist in white balancing captured images. Sensor data captured from the various sensors may be processed to generate other types of metadata. For example, sensor data from the sensors can provide coordinates identifying the location of the camera system 100 (e.g., a processing station in a garment acquisition system). Further, the sensor data can provide a time stamp to all information collected by the camera system.

The system controller 120 includes a display subsystem that includes various control and display components associated with operation of the camera system 100 including, for example, LED lights, a display, buttons, and the like. The display system can indicate information and images obtained from the camera system. Additionally, the camera system 100 includes a power assembly that can include power cells, power inputs, etc. for powering various components of the camera system (e.g., the image processor, or the illumination source 130).

Further, the camera system 100 includes an illumination source 130. Typically the illumination source 130 is a light emitting diode (LED) array that produces white light. In one example, the LED array produces white light using several LEDs emitting different wavelengths that have a spectral power distribution that approximates white light. In another example, LED array produces phosphor converted white light using blue LEDs including yellow phosphors.

In other embodiments, the illumination source 130 can be any light source capable of producing a white light spectrum such as a tungsten halogen lamp, a fluorescent lamps, a xenon lamp, etc. In still other embodiments, the illumination source 130 is configured to produce any other color of light (e.g., blue, green, red, white, etc.) using any number or combination of methods. In some cases, the illumination source 130 can be tunable such that a user of the camera system can select the color of light emitted by the illumination source. The configuration of the illumination source 130 is described in more detail in regards to FIGS. 3C-3D.

Additionally, the camera system 100 includes a retroreflective surface 140. Generally, the retroreflective surface is separated from the camera body at a distance allowing for high quality image capture of objects mounted on the retroreflective surface 140. In some configurations, the retroreflective surface 140 is coupled to the camera body by a support system, while in other configurations the retroreflective surface 140 is a separate structure or object.

The retroreflective surface 140 includes an array of retroreflectors that reflect light back towards its source (i.e., illumination source 130) with minimal scattering. In a retroreflector, an electromagnetic wave front (i.e., light) is reflected back along a reflection angle that is parallel to the wave's incident angle. In some configurations, the retroreflective surface includes filters that change the wavelength (or spectrum) of the reflected light. As an example, one configuration of retroreflective surface may reflect green light from incident white light.

Figure 2A:
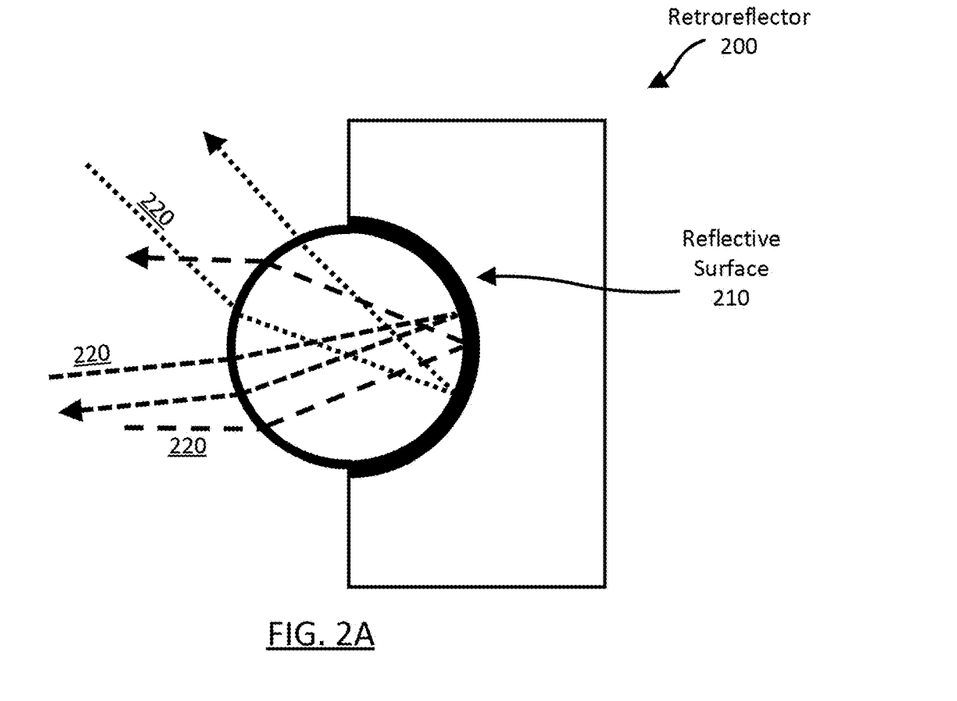
FIG. 2A is an illustration of a retroreflector of the retroreflective surface, according to one example embodiment.
Figure 2B:
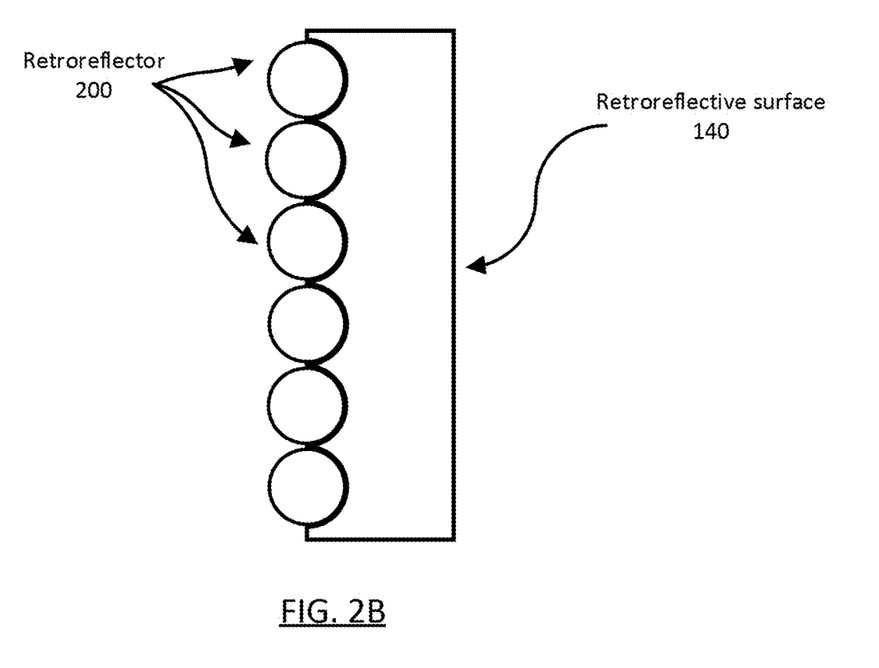
FIG. 2B is an illustration of an array of retroreflectors representing a retroreflective surface, according to one example embodiment.

FIG. 2 shows an example of a retroreflector 200 of a retroreflector array included in the retroreflector surface 140, in one example embodiment. In this case, a transparent sphere adjacent to a hemispherical mirror (e.g., reflective surface 210) works as the retroreflector 200. The incident light rays 220 enter the retroreflector 200 at three different incident angles and can impinge on the reflective surface 210 of the retroreflector 200. Whatever the incident angle, the retroreflector 200 reflects the incident light at a reflection angle parallel to the incident angle. As demonstrated in FIG. 2B, a large relatively thin retroreflective surface 140 can be formed by combining many small retroreflectors 200 using array tiling (e.g., hexagonal, cubic, etc.). The retroreflectors 200 of the array can be any type or combination of retroreflectors including a corner reflector, a cat's eye retroreflector (e.g., a retroreflective bead), a phase conjugate mirror, etc. The retroreflectors 200 of the retroreflective surface 140 in FIGS. 2A and 2B are illustrated in two dimensions for clarity; however, the retroreflectors 200, reflective surface 210, and retroreflective surface 140 generally extend in a third dimension (e.g., into and out of the page) with similar functionality.

The retroreflective surface 140 is configured such that an object can be mounted to the retroreflective surface for capture by the imaging optics 110. For example, the retroreflective surface 140 can be a horizontal flat surface, a vertical flat surface, a curtain, a sheet, a painted wall, etc. In one particular embodiment, the retroreflective surface 140 is an array of small retroreflective beads that form a retroreflective sheet. The retroreflective sheet strongly reflects light imaged with small angles between the imaging optics 110 and the illumination source 130 source directed toward the sheeting, but appears non-reflective when viewed from other directions. In some configurations, the retroreflective surface 140 can be mounted to a subsequent surface (e.g. placing a retroreflective sheet on a table, etc.). In other configurations, the retroreflective surface 140 can include mounting hardware for mounting an object to the retroreflective surface 140. The mounting hardware can include snaps, Velcro, mannequins, hangars, buckles, etc. In other examples, an object can be directly mounted to the retroreflective surface 140 (i.e. placed on the surface).

Figure 3A:
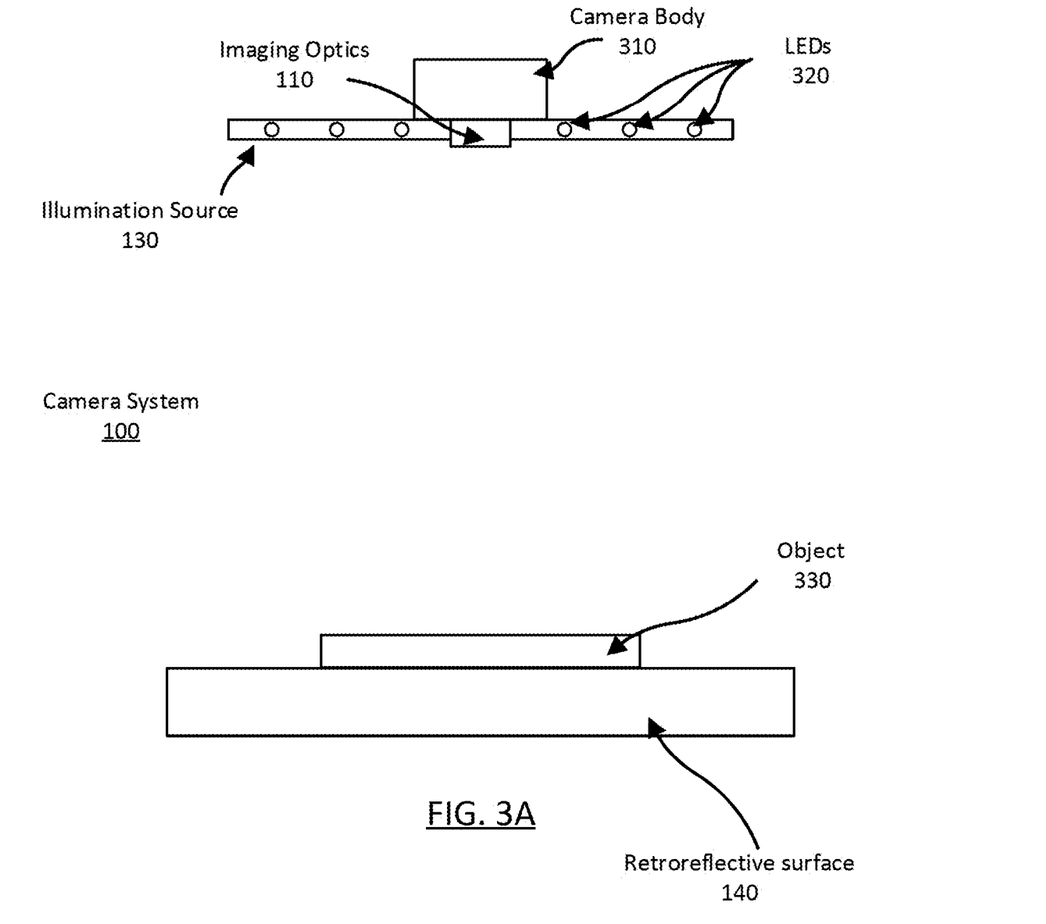
FIG. 3A is a cross-sectional view of the camera system, according to one example embodiment.

FIG. 3A illustrates a cross sectional view of the camera system 100, according to one example embodiment. The camera body 310 includes imaging optics 110 directed towards the retroreflective surface 140. The illumination source 130 is coupled to camera body and includes an array of LEDs 320 that emit white light towards the retroreflective surface 140. In this example embodiment, the retroreflective surface 140 is a retroreflective sheet configured to reflect light towards the imaging optics 110 and illumination source 130. An object 330 is mounted to the top side of the retroreflective surface 140 such that it can be imaged by the camera system 100. The imaging optics 110, illumination source 130, and system controller 120 (not pictured) are separated from the retroreflective surface 140 such that the imaging optics 110 can obtain a high quality image of the object 330 mounted to the retroreflective surface 140.

Figure 3B:
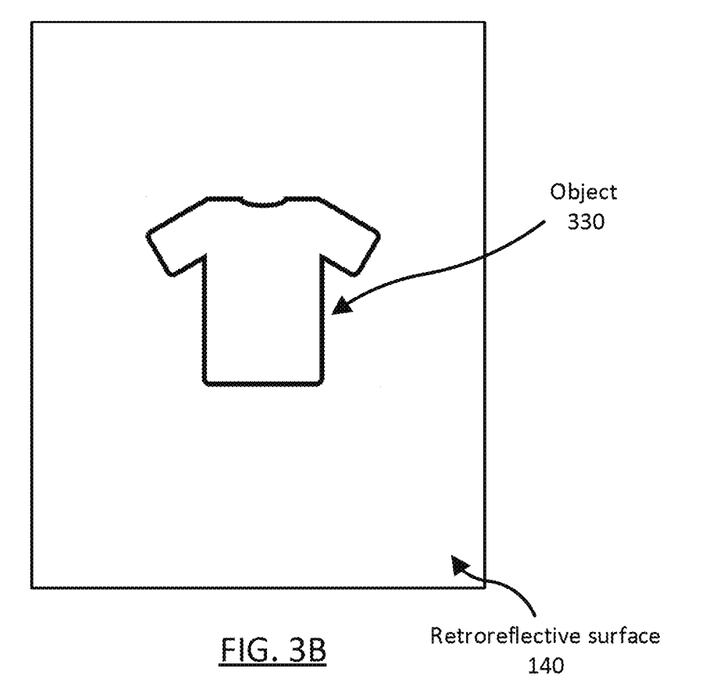
FIGS. 3B-3D are planar views of the camera system, according to various example embodiments.
Figure 3C:
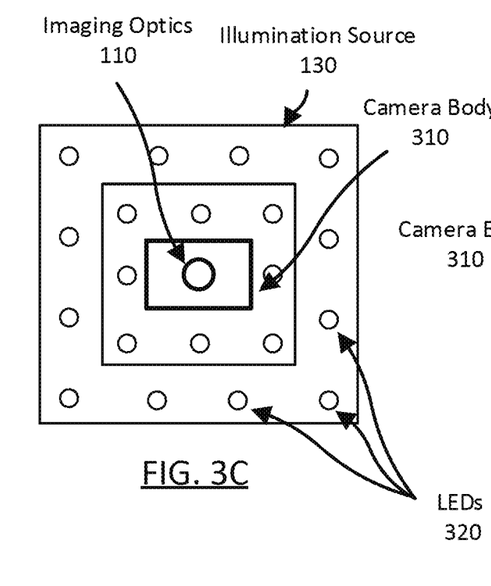
Figure 3D:
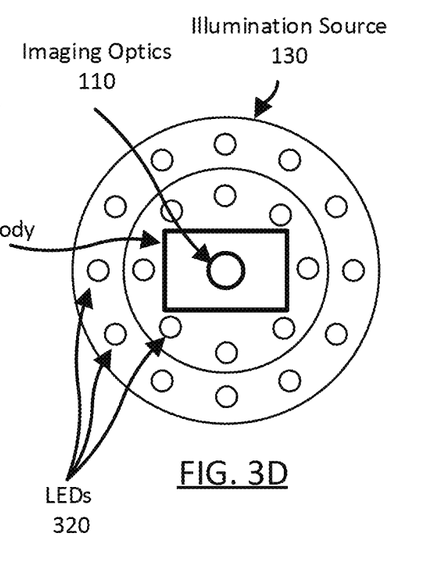

FIG. 3B-3D illustrate plan views of the camera system 100, according to some example embodiments. FIG. 3B is a plan view of the retroreflective surface 140. In the illustrated embodiment, an object 330 (e.g., a t-shirt) is mounted to the retroreflective surface 140 (e.g. a horizontally flat retroreflective sheet) for imaging by the imaging optics. FIGS. 3C and 3D illustrate plan views of the camera body 310 and illumination source 130. In FIG. 3B the illumination source 130 is a square array of LEDs 320 coupled to the camera body 310 with the imaging optics 110 at the center of the square array. In FIG. 3D the illumination source 130 is a circular array of LEDs 320 coupled to the camera body 310 with the imaging optics 110 at the center of the array. In other configurations, the illumination source 130 can be any shape or size and the camera body 310 can be coupled to the illumination source 130 such that the imaging optics 110 are in any location relative to the LED array. In some configurations, the illumination source 130 can be coupled and decoupled from the camera body 310 by a user of the camera system 100.

Figure 4A:
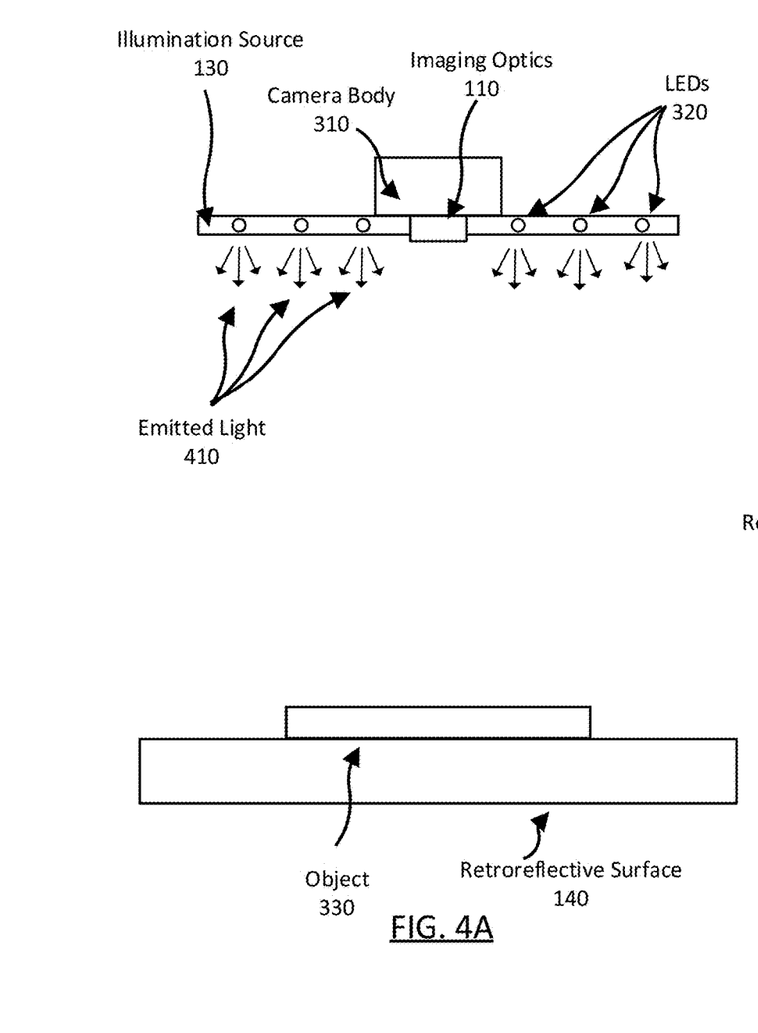
FIGS. 4A-4B are illustrations of white light propagating in the camera system when capturing an image of the object, according to one example embodiment.
Figure 4B:
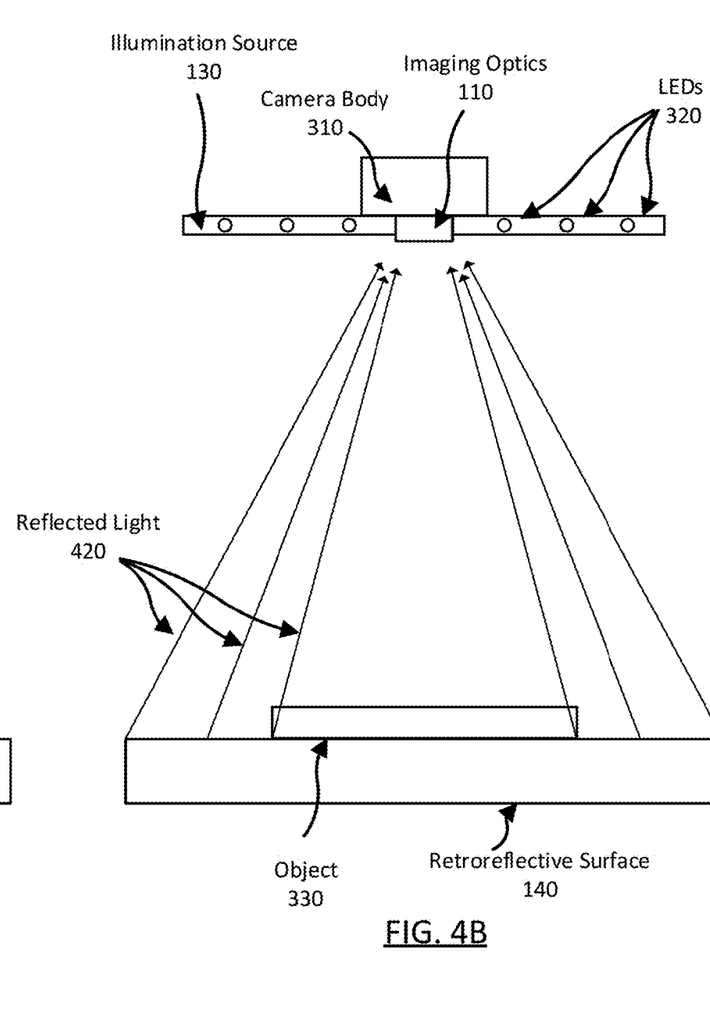

FIG. 4A-4B illustrate the propagation of white light in the camera system 100 when imaging an object 330, according to one example embodiment. The object 330 is mounted to the retroreflective surface 140 and the illumination source 130 is coupled to the camera body 310. The illumination source 130 is configured to emit white light 410 towards the retroreflective surface 140 from the LEDs 320. Generally, the emitted light 410 is emitted at various angles towards the retroreflective surface 140. The reflected light 420 reflects off of the retroreflective surface 140 in areas where the object 330 does not obscure the retroreflective surface 140. In unobscured areas, the reflected light 420 is reflected such that the reflected light 420 can be captured by the imaging optics 110. The reflected light 420 received from unobscured areas generally saturates the image sensor of the imaging optics 110 such that those pixels appear pure-white. Reflected light received from areas obscured by the object 330 (rays not illustrated) generally does not saturate the image sensor of the imaging optics 110 and those pixels appear the color of the object 330.

Figure 5:
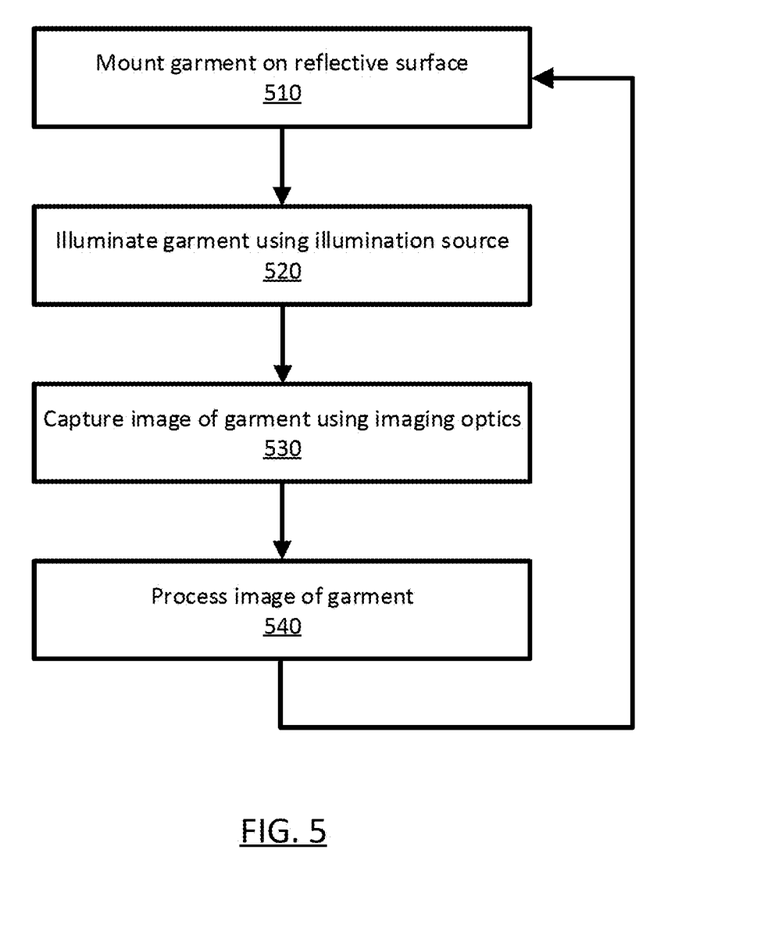
FIG. 5 is a flow diagram illustrating a method for capturing an image against a white background, according to one example embodiment.

FIG. 5 is a flow diagram of one method 500 for imaging objects against a similar white background between captured images, according to one example embodiment. In the example described below, the processes is performed by the camera system 100 of FIGS. 1-4. In this example, the camera system 100 images a garment for display on a webpage of an order fulfillment system.

In FIG. 5, the garment is mounted 510 on the retroreflective surface 140 of the camera system 100 using the mounting hardware of the retroreflective surface 140. The retroreflective surface 140 is a horizontally flat retroreflective sheet surface including a hexagonal array of miniature cat's eye retroreflective beads. As mounted, the garment obscures a center portion of the retroreflective surface 140 while an outer portion of the retroreflective surface 140 remains unobscured. In a particular example, a white dress can be laid on top the retroreflective surface 140 for imaging.

The garment is illuminated 520 by an illumination source 130 coupled to the camera body 310 of the camera system 100. The illumination source 130 is a circular array of LEDs configured to emit a white light spectrum away from the camera body 310 and towards the retroreflective surface 140. The camera body 310 and coupled illumination source 130 are positioned such that the illumination source 130 emits the white light towards the retroreflective surface 140. The garment reflects light of any color towards the camera body 310 representing the garment. The retroreflective surface 140 reflects white light towards the camera body in areas where the retroreflective surface is unobscured by the garment. Continuing the example, the as emitted white light reflects off of the retroreflective surface 140 towards the camera system. The white light reflects off of the white dress laid on top of the retroreflective surface 140 as light representing the dress towards the camera body 310.

The camera system 100 captures 530 an image of the garment using an image sensor of the camera system 100. The image sensor measures the reflected light from the retroreflective surface 140 and the reflected light from the garment. Generally the reflected light from the retroreflective surface saturates the image sensor such that those areas appear pure-white. In most cases, the reflected light from the image sensor does not saturate the image sensor and represents the color of imaged garment. Subsequently, the image sensor generates an image of the garment on the retroreflective surface 140. The captured image includes a representation of the garment on the retroreflective surface 140 and pure-white areas where the garment does not obscure the retroreflective surface 140. In practice, some configurations may show slight variations in pure-white in the captured image (e.g., a pixel values between 253 and 255 rather than wholly 255). Continuing the example, the captured image includes overexposed areas where the retroreflective surface is present in the image and white areas representative of the white dress where the dress is present in the image.

Further, in one configuration, the camera system processes 540 the image using stored settings of the camera system. In one example, the image including the white dress and the over-exposed areas of the retroreflective surface has slight variations in the pure-white areas. As such, the camera system 100 normalizes the pure-white areas using a stored system setting of the camera system 100. In other configurations, the camera system processes 540 the image using any of a variety of image processing techniques such as noise filtering, color filtering, feature extraction, item classification, metadata association, etc.

In some cases, the camera system 100 can remove, mount 510, illuminate 520, and image 530, a series of garments (e.g., automatically or by a user of the camera system 100). Hence, each captured image has similar pure-white areas generated from the retroreflective surface 140 and illumination source 130. Thus, the captured images provide an accurate representation of the relative color variations between the different objects of the images. Further, the similarity between pure-white areas amongst captured images is beneficial when displaying garments on the website of the order fulfillment system. In some cases, the camera system processes 540 each captured such that all of the images have identical pure-white areas.

In the illustrated embodiments, illumination sources 130 using LEDs consume far less energy than typical flash and lamp systems. The illumination source 130 about the imaging optics 110 additionally ensures that all objects imaged by the camera system 100 are evenly illuminated for high quality images. Furthermore, the retroreflective surface 140 is an inexpensive system that produces high quality white backgrounds between images. The high quality white backgrounds allow for light and white colored objects to be easily imaged for display on the website of an order fulfillment system. Thus, the combination of retroreflective surface 140 and white light illumination source 130 allows for a camera system 100 that captures high quality images and facilitates inexpensive imaging of a large number of objects with a nearly identical pure-white background.

Figure 6A:
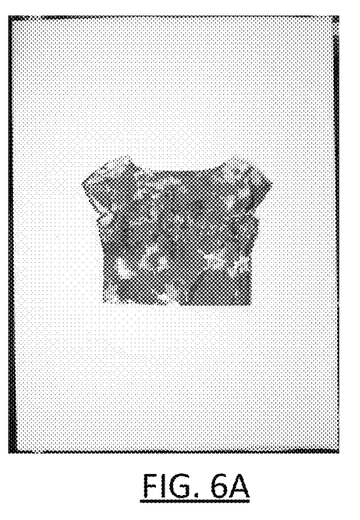
FIGS. 6A-6D are garments imaged against a white background using methods known in the prior art and the described camera system.
Figure 6B:
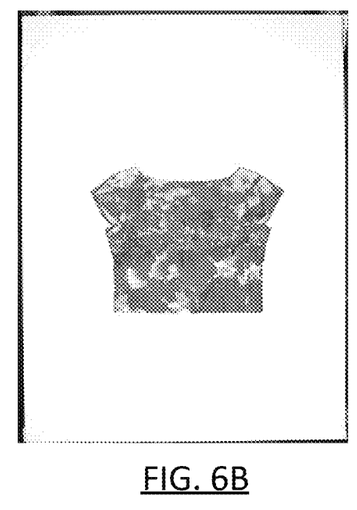
Figure 6C:
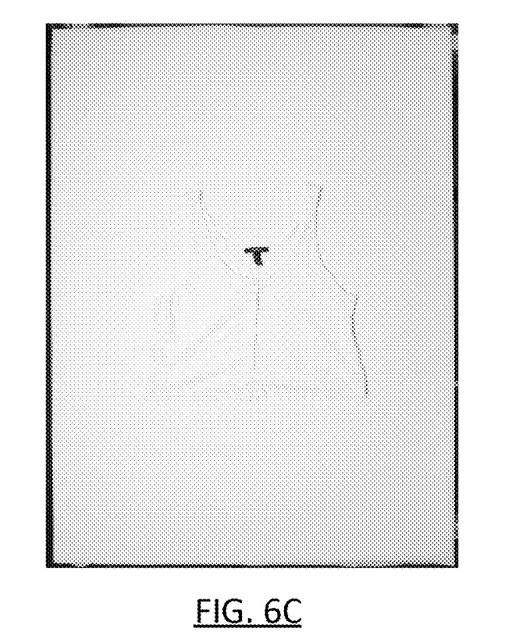
Figure 6D:
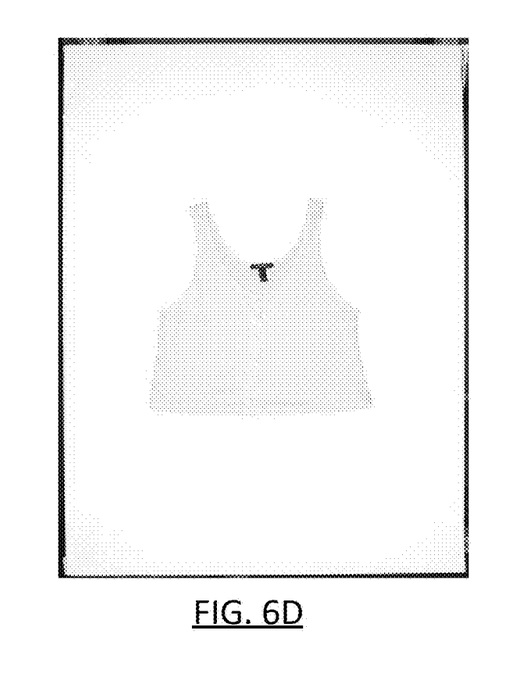

FIGS. 6A-6D are images illustrating the differences between a method known in the prior art for imaging a garment against a white background and the camera system 100 described in FIGS. 1-4. FIG. 6A is an image of a multi-colored blouse (i.e., colored shirt) imaged against a white sheet using a method known in the prior art. Here, the colored shirt is placed on the white sheet and a camera system (not pictured) images the garment with front lighting. FIG. 6B is an image of the same colored shirt imaged against a retroreflective surface 140 using the described camera system 100. Similarly, FIG. 6C is an image of a white tank top (i.e., white shirt) imaged against a conventional white sheet, and FIG. 6D is an image of the same white shirt using the retroreflective surface 140 of the described camera system 100. In FIGS. 6A and 6C, the conventionally imaged garments show fluctuations in the white background, poorly defined edges in the garment, muted colors, and reduced contrast. In FIGS. 6B and 6D, the garments imaged using the retroreflective background 140 show increased brightness, similar white backgrounds, higher contrast, and more clearly defined edges. In particular, the white shirt in FIG. 6C is poorly defined and difficult to see yielding a poor representation of the garment. On the other hand, the white shirt in FIG. 6D is clearly defined and a higher quality representation of the garment. The garment images in FIGS. 6A-6D are meant as a general illustration of the image quality improvement of the described camera system 100. However, various imaging techniques, imaging conditions, and imaged garments can yield differing levels of garment imaging improvement between the prior art and the described camera system 100.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A system comprising:
an illumination source to emit light;
a flat retroreflective surface that reflects the light at a reflection angle that is the same as the incident angle, the flat retroreflective surface configured for:
directly mounting an object such that the object is capturable by an image sensor, the object reflecting the white light in colors that represent the object towards the image sensor, and
reflecting the light towards the image sensor when the retroreflective surface is unobscured by the directly mounted object; and
a camera comprising a camera body and the image sensor, the image sensor to capture an image including the directly mounted object and the flat retroreflective surface, and wherein:
the flat retroreflective surface is external to the camera body, and
the illumination source is mounted such that it emits light towards the flat retroreflective surface at approximately the same angle that the camera receives reflected light from the flat retroreflective surface.

2. The system of claim 1, wherein the illumination source comprises an array of light emitting diodes configured to emit a spectrum similar to white light.

3. The system of claim 2, wherein the array of light emitting diodes are positioned in a circular pattern about the imaging optics.

4. The system of claim 2, wherein the array of light emitting diodes are positioned in a square pattern about the imaging optics.

5. The system of claim 1, wherein the illumination source is decouplable from the camera body.

6. The system of claim 1, further comprising a mounting mechanism for coupling the object to the retroreflective surface.

7. The system of claim 1, wherein the retroreflective surface is a distance separated from the imaging optics and illumination source.

8. The system of claim 1, further comprising optical elements for focusing reflected light onto the image sensor from external the camera body.

9. The system of claim 1, wherein the flat retroreflective surface is an array of retroreflective beads arrayed in a flat retroreflective sheet.

10. A method comprising:
mounting an object directly to a flat retroreflective surface, the flat retroreflective surface configured to reflect incoming light at a reflection angle that is the same as the incident angle of the incoming light when the flat retroreflective surface is unobscured by the object;
illuminating the object and the flat retroreflective surface with light emitted from an illumination source coupled to a camera body of a camera system, the light emitted away from the camera body and towards the object directly mounted to the flat retroreflective surface; and
capturing, using an image sensor of the camera system, an image including the directly mounted object and the flat retroreflective surface using light reflected from the directly mounted object and the flat retroreflective surface, the flat retroreflective surface reflecting white light towards the camera system, and the directly mounted object reflecting the white light in colors that represent the object towards the camera system.

11. The method of claim 10 wherein the emitted light is white light.

12. The method of claim 10 wherein the flat retroreflective surface in the image is an area of oversaturated pixels.

13. The method of claim 10, further comprising:
removing the directly mounted object from the flat retroreflective surface;
mounting, directly, a second object to the flat retroreflective surface;
illuminating the directly mounted second object and the flat retroreflective surface; and
capturing a second image of the directly mounted second object and the flat retroreflective surface.

14. The method of claim 13 wherein the flat retroreflective surface is imaged as an area of oversaturated pixels in the first image and the second image.

15. The method of claim 10, wherein illuminating the object further comprises:
activating an array of light emitting diodes coupled to the illumination source.

16. The method of claim 10, wherein mounting the object further comprises:
actuating a mounting mechanism such that the object is coupled to the retroreflective surface.

17. The method of claim 12, wherein the image is displayed on a web-page of an online order fulfillment system.

18. The method of claim 14, wherein the image and second image are displayed on the web-page of an order fulfillment system, and the retroreflective surface in the images appears the same between the images.

19. The method of claim 10, further comprising:
selecting a wavelength of light to emit with the illumination source.

20. The method of claim 10, further comprising:
displaying the captured image on a display screen of the camera body.

21. The system of claim 1, wherein the illumination source is positioned such that the directly mounted object does not create shadows on the flat retroreflective surface.

22. The system of claim 1, wherein the captured image does not include a shadow of the directly mounted object on the retroreflective surface.

* * * * *